US009360948B2

(12) United States Patent
Alfadli et al.

(10) Patent No.: US 9,360,948 B2
(45) Date of Patent: Jun. 7, 2016

(54) KEYBOARD SYSTEM WITH CHANGEABLE KEY DISPLAYS

(71) Applicants: Mohammed Abdullah M. Alfadli, Kuala Lumpur (MY); Abdulilah Mohammed M. Al Nabulsi, Kuala Lumpur (MY); Tarek Messikh, Kuala Lumpur (MY); Adel Deghdak, Kuala Lumpur (MY)

(72) Inventors: Mohammed Abdullah M. Alfadli, Kuala Lumpur (MY); Abdulilah Mohammed M. Al Nabulsi, Kuala Lumpur (MY); Tarek Messikh, Kuala Lumpur (MY); Adel Deghdak, Kuala Lumpur (MY)

(73) Assignee: GIFTY GROUP LTD, Jalan Merdeka, Federal Territory of Labuan (MY)

( * ) Notice: Subject to any disclaimer, the term of this patent is extended or adjusted under 35 U.S.C. 154(b) by 0 days.

(21) Appl. No.: 14/383,545

(22) PCT Filed: Mar. 1, 2013

(86) PCT No.: PCT/MY2013/000043
§ 371 (c)(1),
(2) Date: Sep. 6, 2014

(87) PCT Pub. No.: WO2013/133686
PCT Pub. Date: Sep. 12, 2013

(65) Prior Publication Data
US 2015/0293605 A1 Oct. 15, 2015

(30) Foreign Application Priority Data
Mar. 6, 2012 (MY) ........................... PI 2012700056

(51) Int. Cl.
*G09G 5/00* (2006.01)
*G06F 3/02* (2006.01)
*G06F 3/023* (2006.01)

(52) U.S. Cl.
CPC ............ *G06F 3/0219* (2013.01); *G06F 3/0238* (2013.01)

(58) Field of Classification Search
USPC ............ 345/168–172; 715/703; 400/477–496
See application file for complete search history.

(56) References Cited

U.S. PATENT DOCUMENTS

| 6,797,902 | B2 * | 9/2004 | Farage | G06F 3/0202 200/314 |
|---|---|---|---|---|
| 2002/0149568 | A1 * | 10/2002 | Kim | G09G 3/18 345/170 |
| 2003/0020629 | A1 * | 1/2003 | Swartz | G06F 1/163 340/4.41 |
| 2004/0066374 | A1 * | 4/2004 | Holloway | G06F 3/0238 345/168 |
| 2005/0050005 | A1 * | 3/2005 | Ivancic | G06F 3/0231 |
| 2005/0230233 | A1 * | 10/2005 | Hoehne | H01H 13/023 200/314 |
| 2007/0285393 | A1 * | 12/2007 | Ishakov | G06F 3/0238 345/168 |
| 2008/0088590 | A1 * | 4/2008 | Brown | G06F 3/0238 345/168 |
| 2014/0285441 | A1 * | 9/2014 | Lorenzo Riera | G06F 3/0202 345/170 |

FOREIGN PATENT DOCUMENTS

WO 9939259 8/1999
WO 2006087724 8/2006

* cited by examiner

*Primary Examiner* — Pegeman Karimi
(74) *Attorney, Agent, or Firm* — Workman Nydegger

(57) ABSTRACT

A keyboard system with changeable key displays includes a keyboard having multiple keys, each key having a transparent housing and a display panel disposed inside the transparent housing. The display panels are capable of displaying different indicia based on different control signals triggered by a user of the keyboard system. The keyboard system includes a printed circuit board (PCB) membrane connected to each display panel using one or more connectors, such as spring loaded pins, solid connectors, or flexible connectors. The PCB membrane receives data signals relevant to the indicia of the key displays and processes the data signals for display of the indicia by the display panels.

12 Claims, 4 Drawing Sheets

KEYBOARD SYSTEM WITH CHANGEABLE KEY DISPLAYS

CROSS-REFERENCE TO RELATED APPLICATION

The instant application is a national phase of PCT International Patent Application Serial No. PCT/MY2013/000043, filed Mar. 1, 2013, and claims priority to Malaysian Patent Application Serial No. PI 2012700056, filed Mar. 6, 2012, pending, the entire specifications of both of which are expressly incorporated herein by reference.

FIELD OF INVENTION

The present invention relates generally to keyboard. More specifically, the present invention relates to a keyboard system with changeable key displays which are capable to change displays of different set of indicia by a display controller.

BACKGROUND OF THE INVENTION

In computing, a keyboard is a hardware component that acts as mechanical levers or electronic switches to allow a user to input characters or symbols into a computer with a board of keys. Despite the discovery of alternative input devices, such as the mice, touch-sensitive screens, light pens, trackballs, joysticks, and voice recognition devices, the keyboard remains the most widely used and most versatile peripheral used for direct input into computers. A keyboard generally has characters printed or engraved on the keys. In most cases, every single press of a key corresponds to a single written symbol. However, in some cases, to input some symbols require depressing and holding multiple keys concurrently or in sequence. While majority of keyboard keys produce letters, numbers or signs, other keys or simultaneous key presses can produce certain computer commands or other actions.

A keyboard layout relates to the way of multiple keys of a keyboard are arranged in terms of mechanical, functional, and visual layout. Mechanical layout pertains to the physical arrangements and shapes of keys on the keyboard. Functional layout, however, pertains to the arrangement of key-meaning associations of all the keys of a keyboard, relying on the software used to determine this. Lastly, a visual layout pertains to the arrangement of legends or markings on the keys of a keyboard. There are numerous types of arrangements of alphabetic, numeric, and punctuation symbols on the keys. These different types of arrangements of keyboard layouts are getting high demand largely because different user groups require easy access to different symbols for inputting text in different languages, or a specialized layout for those in the fields of computer programming, mathematics, and accounting or other purposes.

The most common layout and physical arrangements of keys on keyboards that are not limited to a specific geographical area is the "QWERTY" layout. Most operating systems have keyboard layout software that allows a user to change the keyboard locale, such as, from a common QWERT keyboard layout to an Arabic keyboard layout. Normally, there is a sign on the computer screen informing the user that what keyboard locale is currently chosen. However, none of the visual markings of the keys themselves changes when a different locale is chosen. Thus, a user will not know what Arabic characters will be appeared on the computer screen when a particular English key is depressed, unless the user has memorized the locations of all the Arabic characters on the keyboard.

Thus, there is a problem concerning the visual markings of characters belonging to different languages on a single keyboard, because a single keyboard can have characters of one or two languages at the most, which limits the number of languages that can be available on the keyboard. As a result, manufacturers will not able to satisfy the needs of all users around the world in terms of their needed language. This problem requires the manufacturer to use different production lines to print the characters of every distinct language on the manufactured keyboards in order to meet the demands of the worldwide markets.

Accordingly, it is desirable to provide a keyboard system with changeable key displays which are capable to change displays of different set of indicia for different languages input or other purposes.

SUMMARY OF INVENTION

Accordingly, it is a primary object of the invention to provide a keyboard system with changeable key displays comprises a keyboard having a plurality of keys with transparent housing; a plurality of display panels each disposed inside the transparent housing of each key, the display panels are capable to display different set of indicia based on controlling signals triggered by a user; a first printed circuit board (PCB) membrane connected to the display panel with a flexible connector, the first PCB membrane receiving data signals relevant to the indicia of the key displays and processing the data signals to display them by the display panel; a system controller connected to the PCB membrane, the system controller having a digital controller and a memory, the digital controller processing the controlling signals and retrieving data relevant to indicia from a database stored in the memory, and the digital controller further sending the data signals to the first PCB membrane; and a displays controller connected to the system controller allowing the user to change their desired key displays by sending the controlling signals to the system controller.

It is another object of the invention to provide display panels which are graphic liquid crystal display (GLCD) panels or electronic paper.

It is another object of the invention to provide a transparent housing comprises a keycap and a bottom cover to enclose the keycap for containing the display panel therein.

It is another object of the invention to provide a key mat with a plurality of bulging protrusions along its upper surface, each bulging protrusion disposed between the pressure foot and the first PCB membrane, the bulging protrusions are collapsed when the pressure feet are being depressed.

It still another object of the invention to provide a second printed circuit board (PCB) membrane and a third printed circuit board (PCB) membrane disposed underneath the first PCB membrane with a gap therebetween, when the corresponding key is being depressed, the applied force pushes the pressure foot and causes the bulging protrusion of the key mat to be collapsed, and electronic circuits of the second PCB membrane and the third PCB membrane are contacted to complete their connection to produce corresponding key output signals.

It still another object of the invention to provide an input controller connected to the second PCB membrane and the third PCB membrane, the corresponding key output signals are transmitted to the input controller for processing and converting to codes that can be interpreted by an operating system when the corresponding key is depressed, the operating system has a software application program, additional data are downloaded through the software application program, the input controller receives the additional data from the operating system and sends the additional data to the digital controller to be stored inside the database of the memory.

The present preferred embodiments of the invention consists of novel features and a combination of parts hereinafter fully described and illustrated in the accompanying drawings and particularly pointed out in the appended claims; it being understood that various changes in the details may be effected by those skilled in the arts but without departing from the scope of the invention or sacrificing any of the advantages of the present invention.

BRIEF DESCRIPTION OF THE DRAWINGS

These and other features, aspects and advantages of the present invention will be more fully understood when considered with respect to the following detailed descriptions, appended claims and accompanying drawings wherein:

DETAILED DESCRIPTION OF THE INVENTION

The present invention relates to a keyboard system. Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

Figure 1:
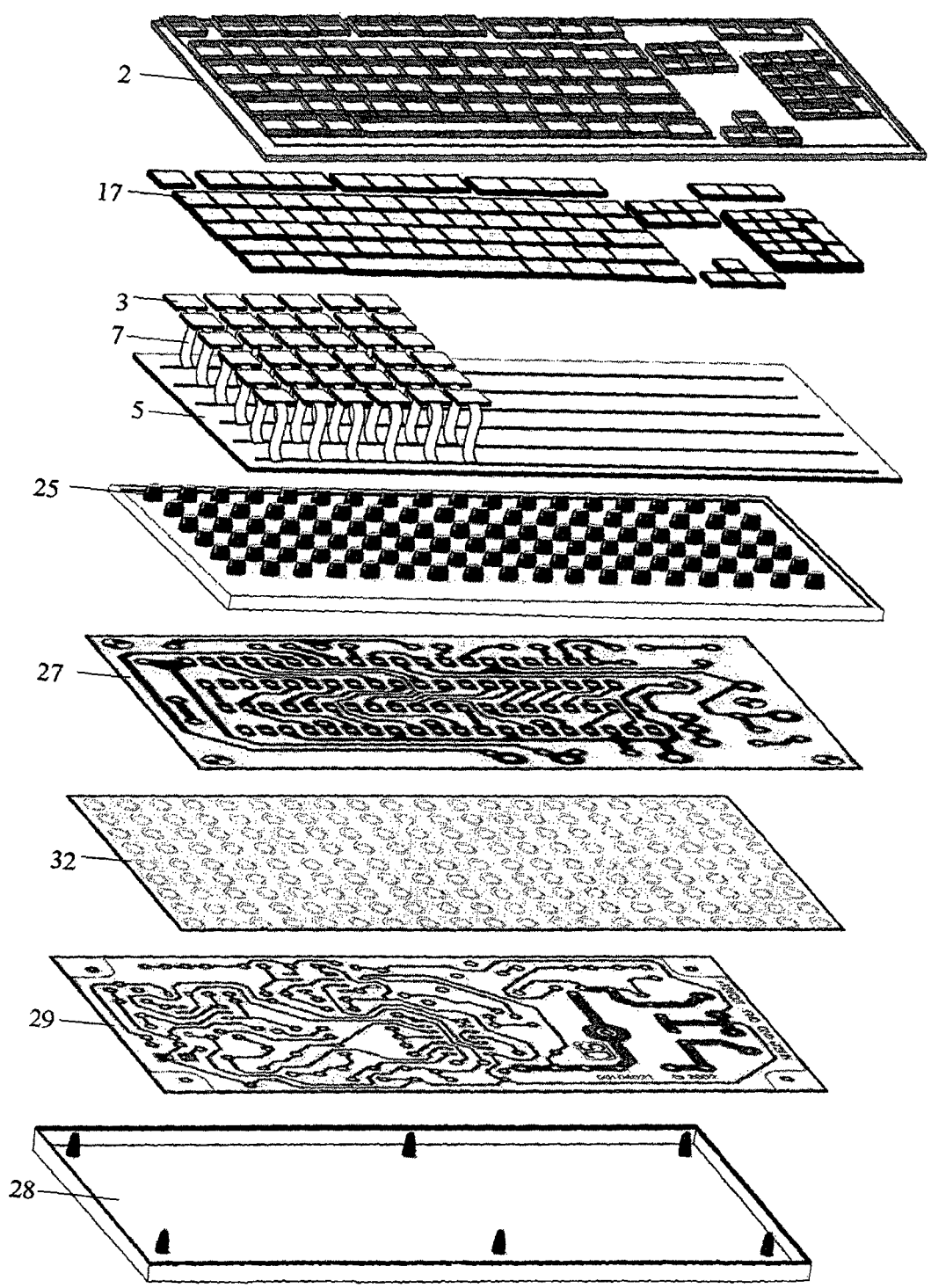
FIG. 1 is an exploded perspective view of a keyboard system in accordance with one embodiment of present invention.

As shown in. FIG. 1, a keyboard system (100) of present invention comprises a few layer of components. The first layer of component is a cover plate (2) which made of durable material. The cover plate (2) has a plurality of openings through which a plurality of keys (1) extend and maintain in place. The second layer of component is a board of keys (1) each has individual transparent housing. The whole area of the housing may be transparent or a partial area of the housing may be transparent, such as top surface of the housing is transparent. The third layer of component is a plurality of display panels (3) each has to be disposed inside the transparent housing of each key (1). The appearance of display panels (3) can be viewed through the transparent housing and altered by a controlling means for the requirement of different inputs into a computer operating system or a program. The fourth layer of component is a first printed circuit board (PCB) membrane (5). The first PCB membrane (5) is a flexible PCB membrane made of flexible material which can be conformed and/or bent. The fifth layer of component is a layer of key mat with a plurality of bulging protrusions (25) along its upper surface, the bulging protrusions (25) will be collapsed when received depressing forces. The sixth layer of component is a second printed circuit board (PCB) membrane (27). The seventh layer of component is a plastic separator (32). The eighth layer of component is a third printed circuit board (PCB) membrane (29). The plastic separator (32) has a function of separating the second PCB membrane (27) and the third PCB membrane (29) to avoid electrical contact between the second PCB membrane (27) and the third PCB membrane (29) when no depressing forces are received by the keys (1). The plastic separator (32) has a plurality of apertures along its length to enable electrical contact between the second PCB membrane (27) and the third PCB membrane (29) when depressing forces are received by the keys (1). The ninth layer of component is a base layer (28) for covering the components on top of the base layer (28).

Figure 2:
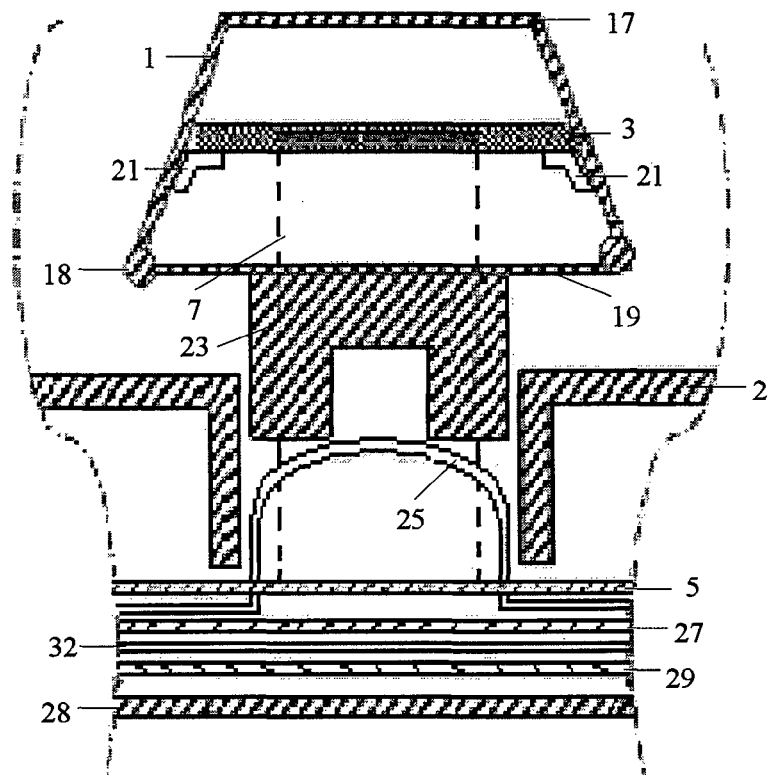
FIG. 2 is a cross-sectional view of a key of a keyboard system in accordance with one embodiment of present invention.

Referring to FIG. 2, there is shown a cross-sectional view of a key (1) of a keyboard system (100) of present invention. The key (1) has transparent housing with a display panel (3) disposed inside the transparent housing of the key (1). The transparent housing comprises a keycap (17) and a bottom cover (19) to enclose the keycap (17) for containing the display panel (3) therein. Two pairs of fastening means (18) such as clips are provided to secure bottom ends of the keycap (17) and side ends of the bottom cover (19) together to form the housing. The display panel (3) is capable to display different set of indicia based on controlling signals triggered by a user. At least two holders (3) each opposedly attached to the sidewalls of the keycap (17) for holding the display panel (3) horizontally inside the housing of the key (1). A first printed circuit board (PCB) membrane (12) connected to the display panel (2) with a flexible connector (4), the first PCB membrane (12) receiving data signals relevant to the indicia of the key displays and processing the data signals to display them by the display panel (3). A pressure foot (23) is attached to the bottom cover (19) of the key (1) to transfer depression movement when the user depresses the key (1). A key mat with a plurality of bulging protrusions (25) along its upper surface, each bulging protrusion (25) disposed between the pressure foot (23) and the first PCB membrane (12), the bulging protrusions (25) will be collapsed when the pressure foot (23) is being depressed. A second printed circuit board (PCB) membrane (27) and a third printed circuit board (PCB) membrane (29) disposed underneath the first PCB membrane (12) with a gap therebetween, whereby when the corresponding key is depressed, the applied force will push the pressure foot (23) and cause the bulging protrusions (25) to be collapsed, and electronic circuits of the second PCB membrane (27) and the third PCB membrane (29) will be contacted to complete their connection to produce corresponding key output signals.

Figure 3:
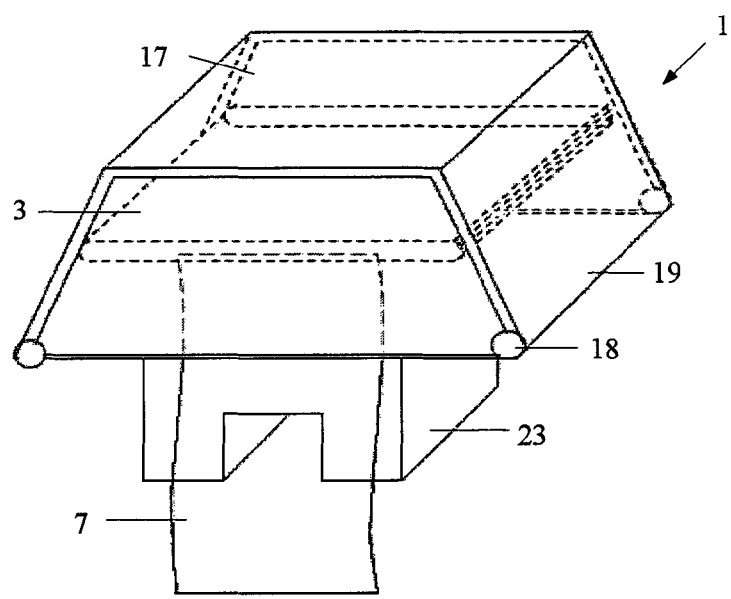
FIG. 3 is a perspective view of a key structure in accordance with one embodiment of present invention.

Referring now to FIG. 3, there is shown a perspective view of a key structure of a keyboard system (100) of the present invention. The display panel (3) is laid horizontally inside the housing of the key (1), at a small distance below top face of the keycap (17). Preferably, the size of the display panel (3) is slightly bigger than the top face of the keycap (17). Preferably, the display panel (3) is graphic liquid crystal display (GLCD) panel or electronic paper display panel. The display panel (3) is built of flexible material, thin and light-weight, that can be conformed, bent, and/or rolled to allow for a variety of display shapes that can further be flexible. Preferably, the GLCD panel is chip-on-glass (COG) type of graphic liquid crystal display. For example, the GLCD panel is 128× 64 Graphic Matrix COG LCD Module Display. Graphic LCD that provides users with a higher degree of flexibility. Graphic LCD is composed of pixels arranged in rows and columns. Every pixel can be addressed individually for text, graphics or both combination. Chip-On-Glass (COG) is a flip chip technology for direct connection assembly of ICs (Integrated Circuits) on glass substrate. The IC is an unpackaged, bare chip and the pitch of the bumps can be scaled down according to user requirements. This technology reduces the assembly area to the highest possible packing density and is implemented in applications where space saving is crucial. It allows a cost-effective mounting of driver chips because integrating flexible PCB is no longer necessary. The IC is bonded directly onto the glass substrate and is suitable for handling high-frequency or high speed signals. Thus, COG GLCD panel is very space saving and can be as thin as 2 mm. COG GLCD panel is very cost effective because much less IC's are required.

Electronic paper can be understood by those in the art to be a portable, reusable storage and display medium that looks like paper but can be repeatedly written on (refreshed) by electronic means for thousands or millions of times. The Gyricon version consists of a single sheet of transparent plastic, containing millions of tiny bichromal (two color) beads in oil-filled pockets. Text and images are displayed through a rotation of the beads that occurs in response to an electrical impulse: a full rotation displays as black or white, and a partial rotation displays as gray shades. Like traditional paper, Gyricon has and needs no lighting component. "Electronic paper" as provided herein, can be understood to include products known as "e-paper", "electronic ink", "e-ink", or "radio paper", and other technologies having other names, yet sharing the same properties.

Figure 4:
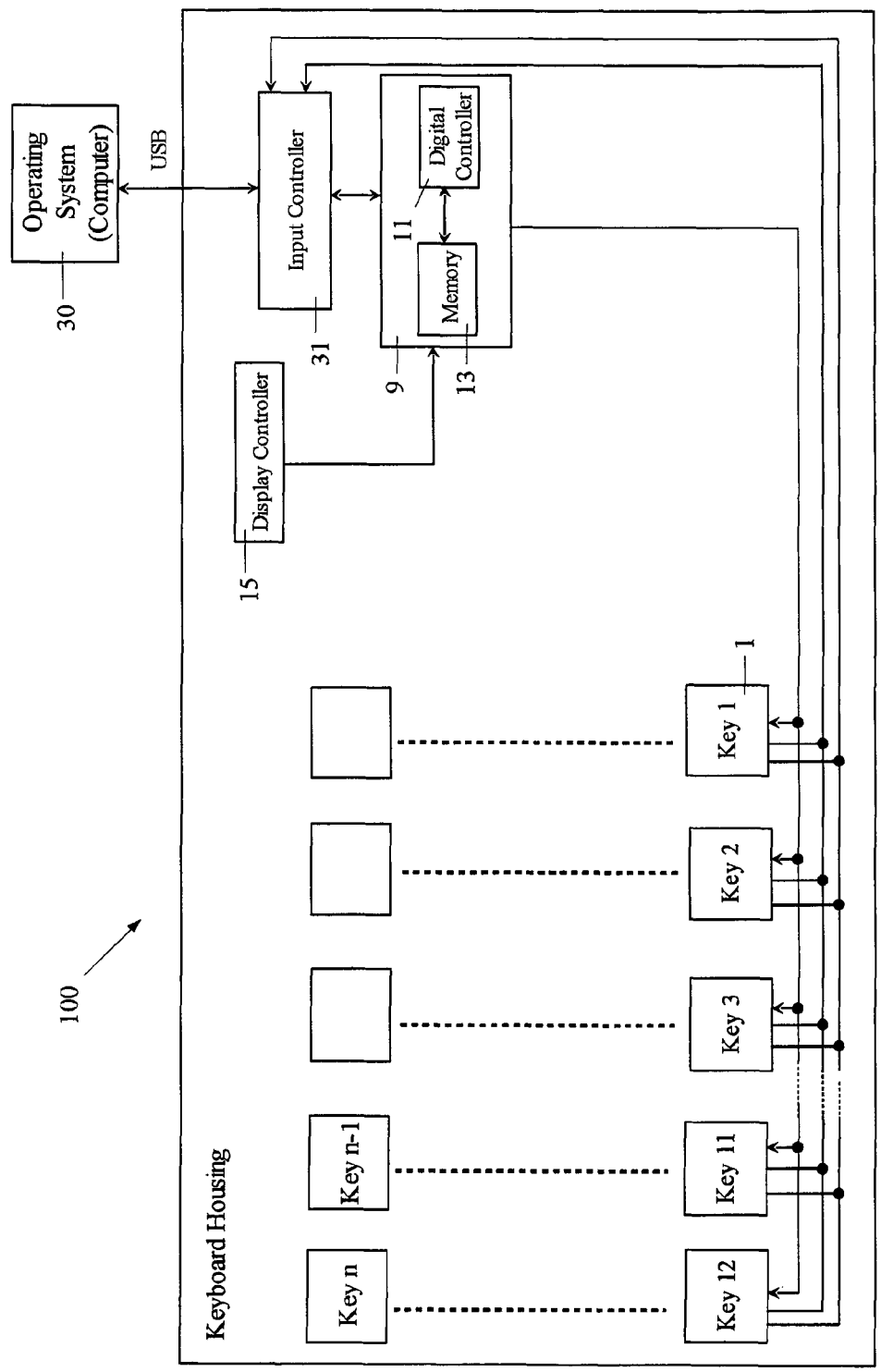
FIG. 4 is a schematic diagram depicting the interconnection of components of a keyboard system in accordance with one embodiment of present invention.

Referring now to FIG. 4, there is shown a schematic diagram depicting the interconnection of the components of a keyboard system (100) of present invention.

Figure 5A:
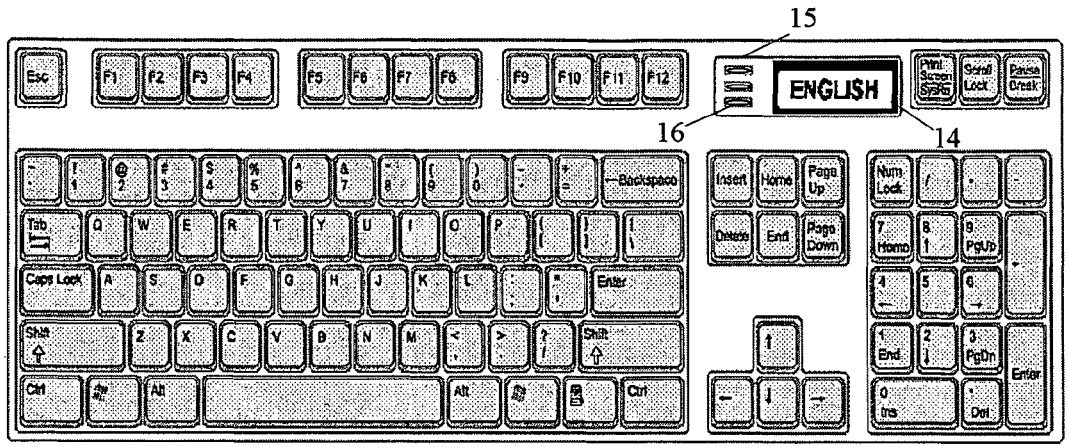
FIG. 5a is a plan view of a keyboard illustrating a display layout (English) example in accordance with one embodiment of present invention.
Figure 5B:
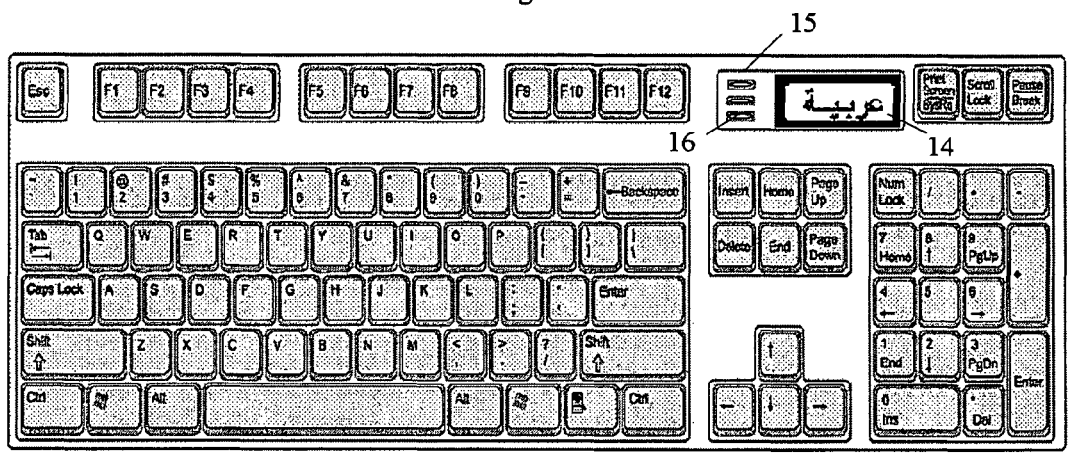
FIG. 5b is a plan view of a keyboard illustrating a display layout (Arabic) example in accordance with one embodiment of present invention.
Figure 5C:
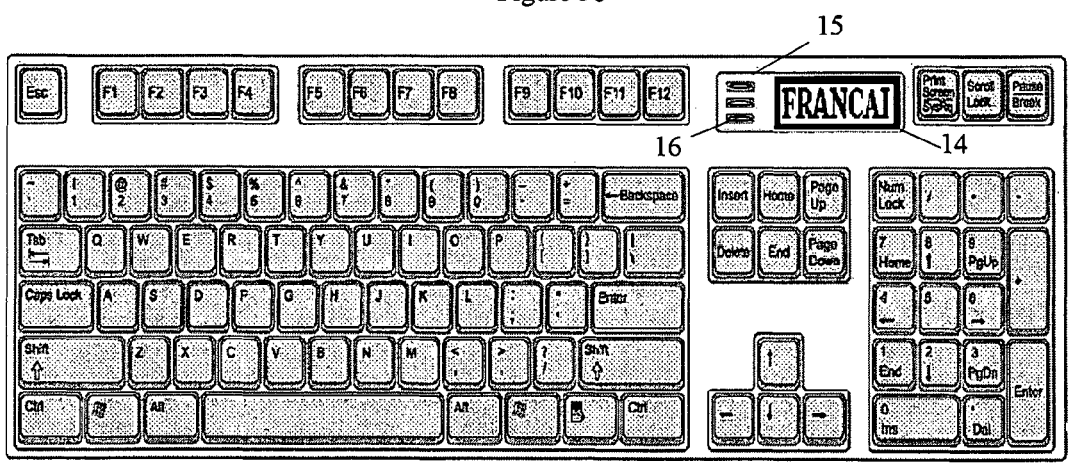
FIG. 5c is a plan view of a keyboard illustrating a display layout (France) example in accordance with one embodiment of present invention.

The keyboard system (100) has a plurality of keys (1) arranged in arrays. A system controller (9) is connected to the first PCB membrane (12) of the keys (1) respectively. The system controller (9) has a digital controller (11) and a memory (13), the digital controller (11) processing the control signals and retrieving data relevant to indicia to be displayed from a database stored inside the memory (13), and the digital controller (11) further sending the data signals to the first PCB membrane (12). The digital controller may be a microcontroller or a processor. The digital controller comprises algorithms therein for manipulating the sequences or arrangement of the indicia to be displayed by the display panels of the keys. The algorithms ensure that each indicium is correctly displayed by its corresponding display panel at a desired position on the keys layout. The first PCB membrane (12) processes the data signals and sends the data signals to the display panels (3) for displaying the indicia. A displays controller (15) is connected to the system controller (9) allowing the user to change their desired key displays by manipulating the control signals sent to the system controller (9). As shown in FIGS. 5a-5c, the displays controller (15) itself comprises a display module (14) showing the type/category of indicia that are currently set by the display controller (15), and a plurality of control buttons (16) to allow the users to change the type/category of indicia that are currently set to be displayed. When the control buttons (16) are pressed, the control signals will be sent to the digital controller (11) for changing the data to be retrieved from the memory (13). The data signals to be sent to the first PCB membrane (12) will be changed and the display panels (3) will automatically display the type/category of indicia manipulated by the displays controller (15).

Still referring to FIG. 4, an input controller (31) is connected to the second PCB membrane (27) and the third PCB membrane (29), the corresponding key output signals will be transmitted to the input controller (31) for processing and converting to codes that can be interpreted by an operating system (30) of a. computer. Preferably, the input controller (31) is connected to the operating system (30) with a Universal Serial Bus (USB) cable. The operating system (30) has a software application program, additional data can be downloaded through the software application program, whereby the input controller (31) receives the additional data from the operating system (30) and sends the additional data to the system controller (9) to be stored inside the database of the memory (13). Preferably, the software application program can be manipulated by the users to send control signals to the system controller (9) through the input controller (31) for the users to change their desired key displays. The software application program can be an alternative of the displays controller (15) to change desired key displays by manipulating the control signals sent to the system controller (9). However, the keyboard system (100) is not limited to be incorporated into computer keyboards, the system (100) can be incorporated into other devices including but not limited to cellular phones, PDAs, portable Internet devices, remote controller, and other electronic devices.

Referring now to FIG. 5a, there is shown a plan view of a keyboard illustrating a display layout (English) example. Preferably, the displays controller (15) is located on the upper right section of the keyboard, the displays controller (15) has a display module indicating "ENGLISH" which is the type of indicia currently displaying by the plurality of display keys (1). The display keys (1) are also capable of depicting other foreign alphabets such as France, Arabic, Chinese, Japanese, Korean and Tamil. FIG. 5b shows a plan view of a keyboard illustrating a display layout (Arabic) example. The displays controller (15) has a display module (14) indicating the symbol "عربي", which is the type of indicia currently displaying by the plurality of display keys (1). Also, FIG. 5c shows a plan view of a keyboard illustrating a display layout (France) example. The displays controller (15) has a display module (14) indicating the symbol "FRANCAI", which is the type of indicia currently displaying by the plurality of display keys (1).

The invention claimed is:
1. A keyboard system with changeable key displays, comprising:
 a keyboard having a plurality of keys, each key having a transparent housing, each transparent housing having a keycap and a bottom cover to enclose the keycap;
 a pressure foot attached to each bottom cover to transfer depression movement when the user depresses a corresponding key;
 a plurality of display panels, each display panel being disposed inside the transparent housing of a corresponding key, the display panels being configured to display different set of indicia based on control signals triggered by a user;
 a first printed circuit board (PCB) membrane connected to the plurality of display panels with one or more connectors, the first PCB membrane receiving data signals rel- evant to the indicia of the key displays and processing the data signals to be displayed by the plurality of display panels;

a key mat with a plurality of bulging protrusions along its upper surface, each bulging protrusion disposed between the pressure foot and the first PCB membrane, the bulging protrusions being collapsible upon depression of the pressure feet;

a second PCB membrane and a third PCB membrane disposed underneath the first PCB membrane and having a gap therebetween, wherein upon depression of a key, an applied force pushes the corresponding pressure foot and causes the corresponding bulging protrusions to be collapsed, thereby causing electronic circuits of the second PCB membrane and the third PCB membrane to be contacted to complete their connection to produce corresponding key output signals;

a system controller connected to the first PCB membrane, the system controller having a digital controller and a memory, the digital controller being configured to process the control signals and retrieve data relevant to indicia from a database stored inside the memory, and send the data signals to the first PCB membrane; and a displays controller connected to the system controller, the displays controller configured to enable the user to change the key displays by manipulating the control signals sent to the system controller.

2. The keyboard system according to claim 1, wherein the display panels are graphic liquid crystal display (GLCD) panels or electronic paper display panels.

3. The keyboard system according to claim 1, wherein the GLCD panel is chip-on-glass (COG) type of graphic liquid crystal display.

4. The keyboard system according to claim 1, further comprising at least two holders each opposedly attached to the sidewalls of the keycap for holding the display panel horizontally inside the housing of the key.

5. The keyboard system according to claim 1, further comprising an input controller connected to the second PCB membrane and the third PCB membrane, the corresponding key output signals are transmitted to the input controller for processing and converting to codes that can be interpreted by an operating system when the corresponding key is depressed.

6. The keyboard system according to claim 5, wherein the operating system has a software application program, additional data are downloaded through the software application program, whereby the input controller receives the additional data from the operating system and sends the additional data to the system controller to be stored inside the database of the memory.

7. The keyboard system according to claim 6, whereby the software application program is manipulated by the user to send control signals to the system controller through the input controller for the user to change their desired key displays.

8. The keyboard system according to claim 1, further comprising a plastic separator disposed between the second PCB membrane and the third PCB membrane.

9. The keyboard system according to claim 1, wherein the keyboard is a computer keyboard, a mobile phone keyboard, or other type of keyboard.

10. The keyboard system according to claim 1, wherein the one or more connectors comprise one or more spring loaded pins.

11. The keyboard system according to claim 1, wherein the one or more connectors comprise one or more solid connectors.

12. The keyboard system according to claim 1, wherein the one or more connectors comprise one or more flexible connectors.

* * * * *